(12) United States Patent
Kim et al.

(10) Patent No.: US 11,740,159 B2
(45) Date of Patent: Aug. 29, 2023

(54) MEASURING METHOD AND SYSTEM FOR DETERMINING PISTON MOVEMENT WITHIN ENGINE

(71) Applicants: TJTENG CO., LTD., Daejeon (KR); Chang-Ju Kim, Daejeon (KR)

(72) Inventors: Chang-Ju Kim, Daejeon (KR); Ju-Kyeong Kim, Daejeon (KR); Myung-Rae Cho, Seoul (KR); Sang-Jae Lee, Hwaseong-si (KR)

(73) Assignees: TJTENG CO., LTD., Daejeon (KR); Chang-Ju Kim, Daejeon (KR)

( * ) Notice: Subject to any disclaimer, the term of this patent is extended or adjusted under 35 U.S.C. 154(b) by 23 days.

(21) Appl. No.: 17/621,064

(22) PCT Filed: Dec. 17, 2020

(86) PCT No.: PCT/KR2020/018524
§ 371 (c)(1),
(2) Date: Dec. 20, 2021

(87) PCT Pub. No.: WO2021/125823
PCT Pub. Date: Jun. 24, 2021

(65) Prior Publication Data
US 2022/0349780 A1  Nov. 3, 2022

(30) Foreign Application Priority Data
Dec. 19, 2019 (KR) .......................... 10-2019-0170819

(51) Int. Cl.
*G01M 15/06* (2006.01)
(52) U.S. Cl.
CPC .................................. *G01M 15/06* (2013.01)

(58) Field of Classification Search
CPC ...................................................... G01M 15/06
USPC ...................................................... 73/114.77
See application file for complete search history.

(56) References Cited

U.S. PATENT DOCUMENTS

| 5,814,724 | A | * | 9/1998 | Romkee | ................ | G01M 15/06 73/114.25 |
| 6,643,946 | B1 | * | 11/2003 | Schuh | .................... | G01B 13/12 33/DIG. 15 |

FOREIGN PATENT DOCUMENTS

| JP | S63182536 A | 7/1988 |
| JP | 2006329886 A | 12/2006 |
| KR | 200130308 Y1 | 12/1998 |
| KR | 2019990032830 U | 7/1999 |
| KR | 100440021 B1 | 7/2004 |
| KR | 100749667 B1 | 8/2007 |

(Continued)

*Primary Examiner* — Eric S. McCall
(74) *Attorney, Agent, or Firm* — Rabin & Berdo, P.C.

(57) ABSTRACT

A rotary jig for rotation of a crank shaft of a vehicle and a measuring system using the same are disclosed herein. The measuring system includes: a rotary jig for rotating a crank shaft by opening only a bonnet in a vehicle stop state; a probe joined to the position where a spark plug of an engine is separated and having an extension rod located at the center of a piston to check a top dead point and to output signal values when the crank shaft is rotated according to rotation of the rotary jig; a pump for supplying air to a cylinder chamber of the engine through a tube connected to the probe to move the piston; a terminal for outputting the signal value of the probe to a display unit through wireless communication; and a control unit for controlling the signal values.

5 Claims, 9 Drawing Sheets

(56) References Cited

FOREIGN PATENT DOCUMENTS

| | | | |
|---|---|---|---|
| KR | 100934404 | B1 | 12/2009 |
| KR | 1020100101850 | A | 9/2010 |
| KR | 102166307 | B1 | 10/2020 |

\* cited by examiner

MEASURING METHOD AND SYSTEM FOR DETERMINING PISTON MOVEMENT WITHIN ENGINE

TECHNICAL FIELD

The present invention relates to an engine measuring system for checking a motion state of a piston operating in a cylinder room of a vehicle engine and measuring whether the engine works normally, and more particularly, to a measuring system for a vehicle engine, which enables a worker to rotate a crank shaft just by opening a hood in a vehicle stop state without lifting a vehicle and can measure a piston motion when a spark plug of the engine is separated and a probe is combined, thereby simply diagnosing whether the engine works normally or not.

BACKGROUND ART

In general, an engine of a vehicle works while various components engage with one another intimately to move in sequence of operation according to signal values.

In case of the vehicle engine, a piston rotates a cam shaft while performing a four-stroke cycle of inhalation, compression, explosion and exhaustion according to rotation of a crank shaft, and wheels of the vehicle are rotated through the rotation of the cam shaft.

That is, a main body of the engine includes a cylinder room formed inside a cylinder block so that the piston can move vertically, and the piston vertically moved in the cylinder room is connected to the crank shaft through a connecting rod so that the crank shaft is rotated according to the operation of the piston. The crank shaft, the connecting rod and the piston always perform a fixed bilateral movement while the engine works.

The piston inhales and compresses air or mixed gas when rising in the cylinder room, and is pushed downward by power of combustion gas. The piston has a piston ring formed outside so as to prevent lubricant from flowing into a combustion chamber when the piston reciprocates in the cylinder.

The connecting rod serves to convert a reciprocating motion of the piston into a rotary motion. In the explosion stroke of the piston, power acting to a piston head is transferred to the crank shaft, but in the other strokes, in reverse, the motion of the crank shaft is transferred to the piston. Therefore, the connecting rod is connected to the crank shaft via a bearing.

The crank shaft is connected with a crank to perform conversion between the reciprocating motion and the rotary motion, and includes: a main journal mounted at an axis part which is the center of rotation; a crank pin mounted at a part combined with a big end part of the connecting rod; a crank arm mounted at a part which connects the main journal and the crank pin with each other; and a balance weight mounted in front of the crank to maintain rotational equilibrium. Moreover, the crank shaft further includes: a sprocket and a crank shaft pulley disposed at a front end thereof, the sprocket being mounted to operate a timing gear or a timing chain (belt) in order to operate the cam shaft and the crank shaft pulley being mounted to operate a water pump and a generator; a flange and a hole formed at the rear thereof, the flange being mounted to facilitate mounting of a flywheel and the hole being formed to allow a worker to fit a pilot bearing for supporting a clutch shaft; and a hole, an oil passage and an oil seal formed inside the crank shaft, the hole and the oil passage being formed to supply hole to a connecting rod bearing and the oil seal being formed to prevent oil of a crank case from leaking.

As described above, the crank shaft which converts the vertically reciprocating motion into the rotary motion is configured to operate within an error range of a design criteria in order to improve fuel efficiency of vehicles, reduce noise caused by vibration, and enhance durability, and measures roundness, coaxiality, parallelism, vibration, a clearance distance, and others in various ways using various measuring devices.

For instance, a bearing is applied to the crank shaft. The bearing forms an oil film on the surface thereof in order to absorb a load or an impact force at a rotated part in a power stroke of the engine. However, if the oil film is not supplied stably, friction generated by rotation of the crank shaft cannot be converted into a liquid state so that the crank shaft and the connecting rod are stuck to each other and the piston stroke becomes irregular.

Besides the above problem, if the crank shaft has some problem, the vertical stroke of the piston is carried out irregularly. So, an operational state of the crank shaft can be checked when the vertical stroke of the piston is measured.

In order to check the operational state of the piston, it is checked that the piston stably moves the top dead point and the bottom dead point during the vertically reciprocating motion. However, in order to check whether the crank shaft works normally, the worker disassembles the whole crank shaft, or lifts the vehicle after opening the combustion chamber, separates the wheels, rotates the crank shaft to be located at the top dead point, and checks the operational state using vacuum pressure.

As described above, in order to measure whether the reciprocating motion of the piston is in a normal state, the worker rotates the crank shaft and measures the piston using a probe. However, it takes lots of time to measure the operational state of the piston since the worker has to lift the vehicle up, separates the wheels and rotates the crank shaft.

DISCLOSURE

Technical Problem

Accordingly, the present invention has been made to solve the technical limits and problems occurring in checking whether a bearing of a connecting rod, which connects a piston with a crank shaft in a vehicle engine, is in a normally combined state or in an abnormally combined state. There were lots of efforts and studies to develop a measuring system of a new structure to measure whether an engine works normally through a piston motion by forcedly rotating a crank shaft in a state where a bonnet is opened and a probe is combined at a position where a spark plug is separated without lifting a vehicle in a vehicle stop state. As a result of the efforts and studies, the present invention has been made.

Therefore, it is an object of the present invention to provide a measuring system for a vehicle engine, which includes a rotary jig allowing a worker to simply rotate a crank shaft after opening only a bonnet of a vehicle so as to move a piston to a position of a top dead point, thereby measuring whether the engine works normally through a piston motion in the state where the piston is moved to the top dead point.

Technical objects to be achieved by the present invention are not limited to the above-described objects and other technical objects that have not been described will be evidently understood by those skilled in the art from the following description.

Technical Solution

To accomplish the above object, according to the present invention, there is provided a measuring system for a vehicle engine to determine whether a piston motion is normal through a clearance of a bearing applied to a connecting rod in the vehicle engine having a crank shaft, the connecting rod and a piston, the measuring system including: a probe screw-coupled to a mounted position of a spark plug, of which the lower portion is separated from the vehicle engine, having a measuring rod extending from the center thereof, wherein an end portion of the measuring rod is located at the center of the upper surface of the piston and is located at a top dead point of the piston according to rotation of the crank shaft in order to measure the top dead point of the piston and to output a corresponding signal value; an air supplier connected with the tube to supply air into an air path formed in the probe and to pressurize the piston, and sensing air pressure; an air inhaler connected with the tube to inhale air through the air path formed in the probe in order to make the inside of the cylinder chamber in a vacuum state, and sensing air pressure; and a control unit operating the air supplier and the air inhaler through a signal value of the probe, receiving signal values generated from the air supplier and the air inhaler, comparing them with stored memory values in order to determine whether or not the engine works normally, and outputting the determination result to a display unit.

Moreover, the measuring system for a vehicle engine further includes a rotary jig for rotating the crank shaft.

Furthermore, the rotary jig includes a rod with which a handle is combined, and a unidirectional rotor provided to an end portion of the rod to rotate the crank shaft in one direction.

The unidirectional rotor includes: a coupler which is rotatably mounted at the end portion of the rod and has an inner diameter of a polygonal part; a gear formed along the outer circumference of the coupler; a conversion breaker which is combined with the end portion of the rod to be rotated around an intermediate rotary shaft and has coupling protrusions formed at both end portions to be geared with the gear; and a locking ball combined with the end portion of the rod and elastically supported by elastic force of a spring to slidably support an intermediate protruding port of the conversion breaker.

Additionally, the probe includes: a pipe-shaped housing; a fixed pipe having a guide hole formed in the middle in an axial direction, a central extension part, an upper guide fit and fixed to a lower end of the housing while the central extension part is caught to the lower end of the housing, a lower guide disposed at a lower part to be inserted into a mounted position of the spark plug of the engine, and a screw part screw-coupled to the mounted position of the spark plug; a block combined with the upper part of the housing and having an air cap fixed at the outside thereof to facilitate air injection and air discharge through the tube; a rod combined with the housing in the axial direction and having a lower end protruding through the guide hole of the fixed pipe and an upper end penetrating through the guide hole formed at the center of the block and combined in a vertically movable manner; a slide pipe combined with the block and having a guide hole; a probing gauge slidably inserted into the guide hole of the slide pipe and having a probing rod of which an end portion is put on the top of the rod and a display unit for displaying a movement distance of the probing rod; and an air path formed from the air cap toward the block and an end portion of the lower guide of the fixed pipe in order to supply air into the cylinder chamber or to induce a vacuum state of the cylinder chamber through inflow and outflow of air.

The probe further includes: a bearing assembly disposed on the block so that the rod can be rotated; and a handle disposed on the block to rotate the housing.

In another aspect of the present invention, the present invention provides a measuring method for a vehicle engine to determine whether a piston motion is normal through a clearance of a bearing applied to a connecting rod in the vehicle engine having a crank shaft, the connecting rod and a piston, the measuring method including: a crank shaft rotating step of opening a bonnet in a vehicle stop state, connecting the rotary jig to the crank shaft protruding from the engine, and moving the rotary jig back and forth to rotate the crank shaft; a meter reading bar combining step of separating the spark plug of the vehicle engine, inserting a meter reading bar into the position where the spark plug is separated so that the lower end of the meter reading bar is located at the center of the upper surface of the piston; a piston location checking step of rotating the rotary jig in the state where the meter reading bar is inserted in order to check whether the piston is located at a top dead point; a probe combining step of separating a spark plug of the vehicle engine in a bonnet opening state and screw-coupling and fixing a probe to the location where the spark plug is separated; a piston top dead point determining step of rotating a rotary jig to check whether the piston is located at a top dead point through an indication value of the probe; an air supplying step of combining an air supplier to a tube connected to the probe in order to supply air through the air supplier; a cylinder chamber vacuumizing step of separating the tube from the air supplier and combining an air inhaler with the tube connected to the probe in order to inhale air through the air inhaler; and a diagnosing step of operating the air supplier and the air inhaler through a signal value of the probe, receiving signal values generated from the air supplier and the air inhaler through a control unit, comparing the signal values with previously stored memory values to determine whether the engine is operated normally, and outputting the determination result to a display unit.

Advantageous Effects

The measuring system and the measuring method for the vehicle engine according to the present invention can rotate the crank shaft through the rotary jig after a worker opens only the bonnet of the vehicle when the crank shaft is rotated to move the piston to the top dead point by measuring a bearing clearance of the connecting rod, which connects the crank shaft with the piston in the vehicle engine, and an simply diagnose a normal state of the bearing by measuring the clearance of the piston through air inhalation and air supply into the probe and the cylinder chamber.

The effects of the present invention are not limited to the above-mentioned effects and further effects not described above will be clearly understood by those skilled in the art.

MODE FOR INVENTION

Hereinafter, preferred embodiments of the present invention will be described in detail with reference to the accompanying drawings. It will be understood that terms to be described later are defined in consideration of the functions of the present invention and must be interpreted as concepts corresponding to the technical idea of the present invention and the same meanings as to be generally or commonly understood by those of ordinary skill in the art. In the description of the present invention, when it is judged that detailed descriptions of known functions or structures related with the present invention may make the essential points vague, the detailed descriptions of the known functions or structures will be omitted.

The present invention relates to a measuring system for measuring whether a piston motion is normal through a bearing clearance when a bearing, which is applied to a connecting rod of the vehicle engine including a crank shaft, the connecting rod and a piston, moves.

Referring to FIGS. 1 to 10, the measuring system for the vehicle engine includes: a probe 100 mounted at the same position as a mounted position of a spark plug of the vehicle engine; an air supplier 200 for supplying air to the probe 100 through connection of a tube (T); an air inhaler 300 for inhaling air from the probe 100 through connection of the tube and inducing the inside of a cylinder chamber into a vacuum state; and a control unit 400 for controlling the above-mentioned components to indicate a measured value and diagnose an operational state of the engine.

A compressor (M) is connected in order to supply and inhale air according to a signal value of the control unit 400.

Figure 1:
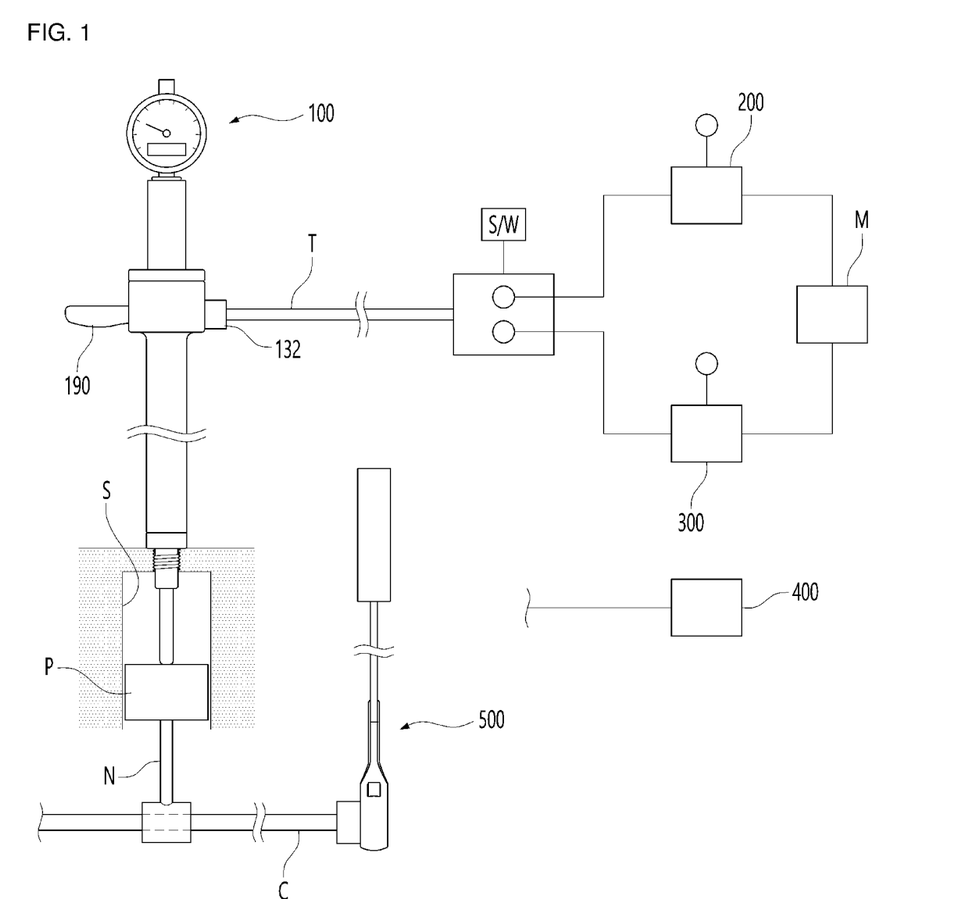
FIG. 1 is a configurative view of a measuring system for a vehicle engine according to a preferred embodiment of the present invention.

The probe 100 is screw-coupled to a mounted position of the spark plug, of which the lower portion is separated from the vehicle engine, and has a measuring rod 110 extending from the center thereof. An end portion of the measuring rod 110 is located at the center of the upper surface of the piston (P) and is located at the top dead point of the piston according to rotation of the crank shaft (C). Then, the probe 100 measures the top dead point of the piston and outputs a corresponding signal value.

The piston (P) is mounted in the cylinder chamber (S) of the vehicle engine, and is located to approach the top dead point from the cylinder chamber (S) through rotation of the crank shaft before the probe 100 is combined.

Figure 2:
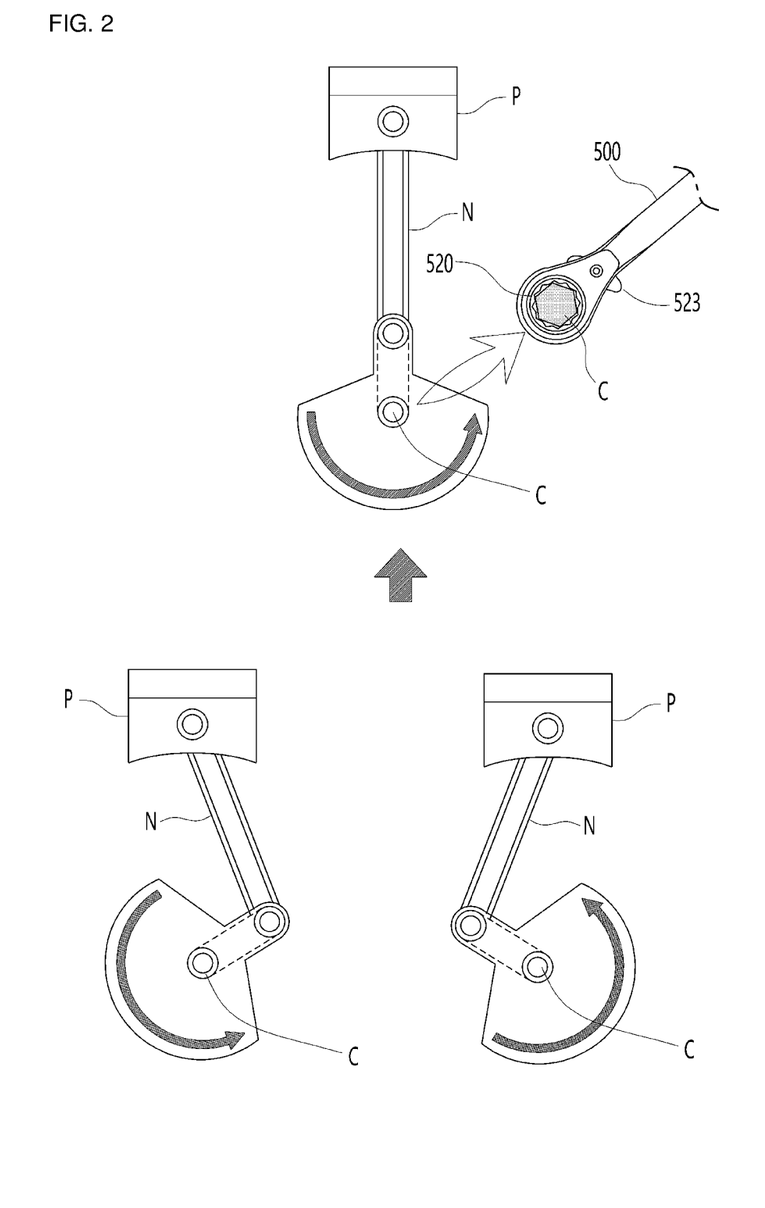
FIG. 2 is a schematic diagram showing a process of transferring a piston through a rotary jig of FIG. 1.

In this instance, the crank shaft (C) rotates through a rotary jig 500 so that the piston (P) is located at the top dead point through a connecting rod (N).

The tube (T) guides air and is connected to an upper part of the probe 100.

Figure 9:
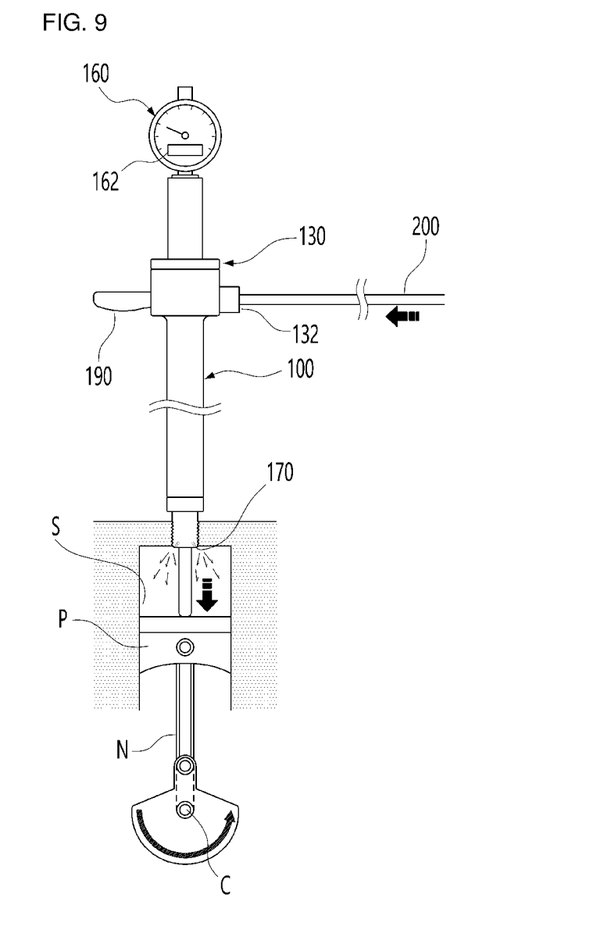
FIG. 9 is a schematic diagram showing a process of injecting air in a state where the probe is applied after measurement of the meter reader of FIG. 8.

The air supplier 200 is connected with the tube (T) to supply air into the cylinder chamber (S) through an air path formed in the probe 100 and pressurize the piston (P). In this instance, the air supplier 200 senses air pressure and checks movement of piston clearance.

Figure 10:
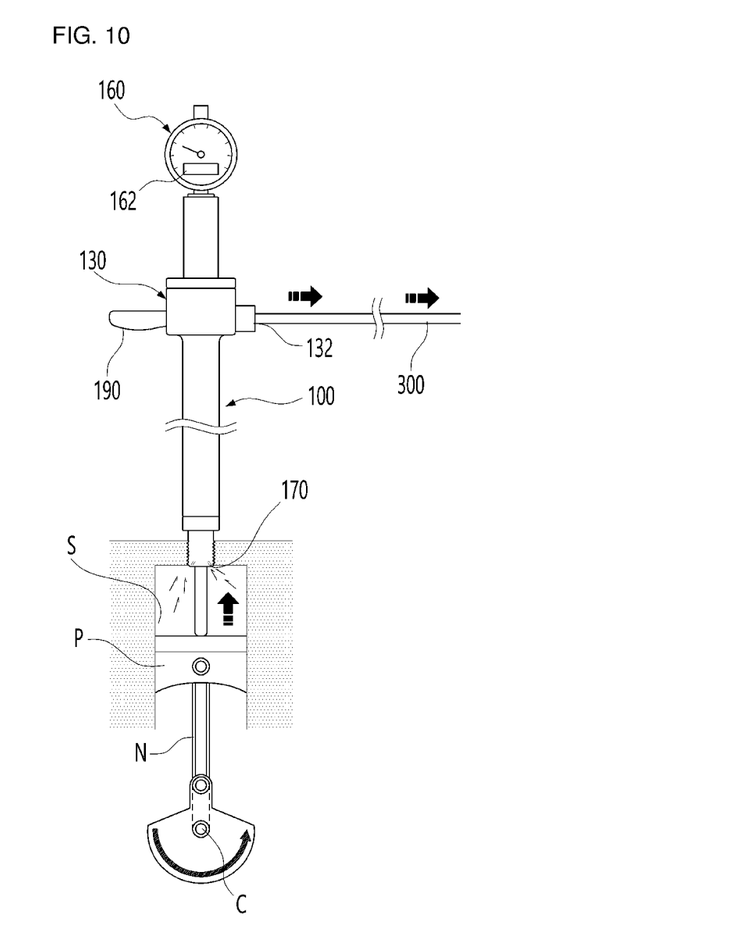
FIG. 10 is a schematic diagram showing a process of inhaling air in the state where the probe is applied after measurement of the meter reader of FIG. 8.

The air inhaler 300 is connected with the tube (T) and inhales air of the cylinder chamber (S) through the air path formed in the probe 100 in order to make the inside of the cylinder chamber (S) in a vacuum state. In this instance, the air inhaler 300 senses air pressure and checks movement of piston clearance.

The control unit 400 operates the air supplier 200 and the air inhaler 300 through the signal value of the probe 100, receives signal values generated from the air supplier 200 and the air inhaler 300, compares them with stored memory values in order to determine whether or not the engine works normally, and then, outputs the determined result to a display unit. The display unit may be a portable terminal.

Moreover, the normal operation state is determined by a vertical movement distance of the piston (P) according to air injection and inhalation, and an abnormal operation state is determined by comparison between the measured value of the movement distance and an input value of the normal state in a memory.

Figure 4:
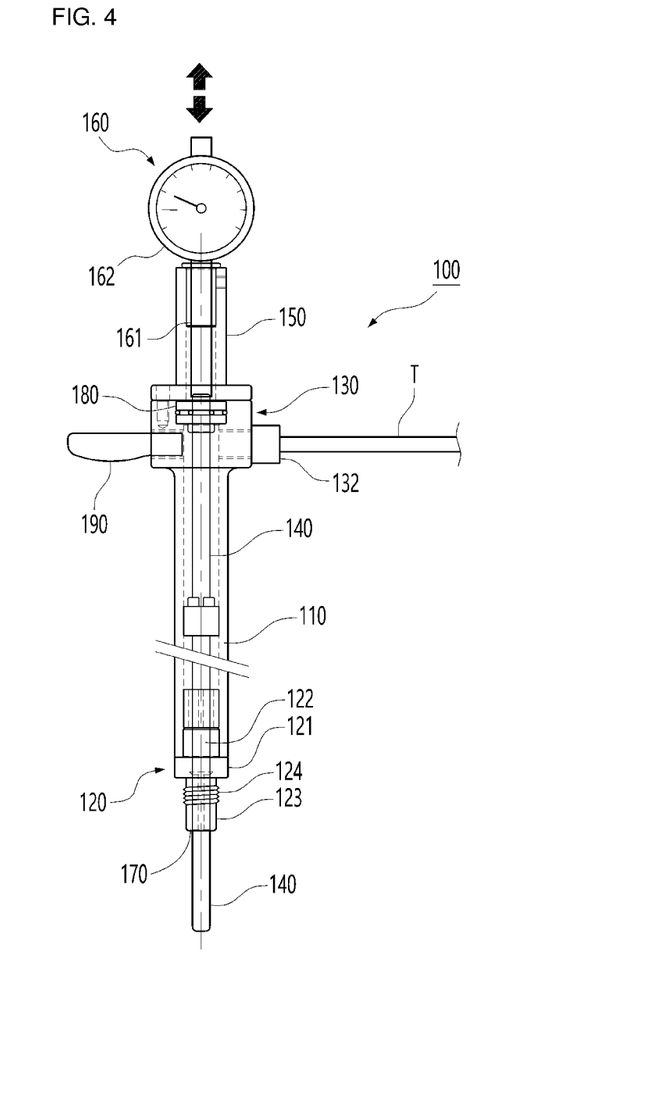
FIG. 4 is a front view of a probe of FIG. 1 applied to the present invention.
Figure 5:
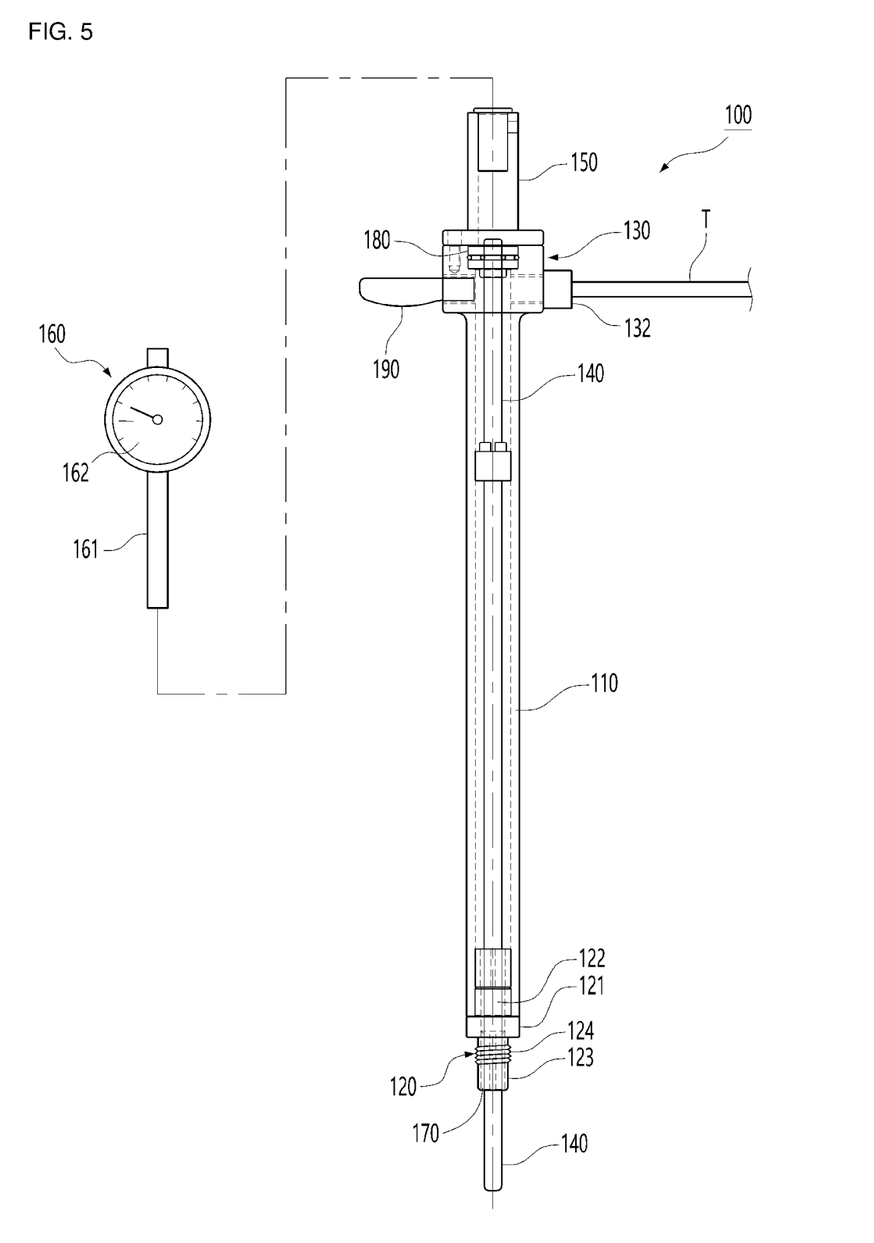
FIG. 5 is a view showing a used state that a probing gauge in FIG. 4 is separated.

The probe 100 includes: a pipe-shaped housing 110; a fixed pipe 120 having a guide hole formed in the middle in an axial direction, a central extension part 121, an upper guide 122 fit and fixed to a lower end of the housing 110 while the central extension part 121 is caught to the lower end of the housing 110, a lower guide 123 disposed at a lower part to be inserted into a mounted position of the spark plug of the engine, and a screw part 124 screw-coupled to the mounted position of the spark plug; a block 130 combined with the upper part of the housing 110 and having an air cap 132 fixed at the outside thereof to facilitate air injection and air discharge through the tube (T); a rod 140 combined with the housing 110 in the axial direction and having a lower end protruding through the guide hole of the fixed pipe 120 and an upper end penetrating through the guide hole formed at the center of the block 130 and combined in a vertically movable manner; a slide pipe 150 combined with the block 130 and having a guide hole; a probing gauge 160 slidably inserted into the guide hole of the slide pipe 150 and having a probing rod 161 of which an end portion is put on the top of the rod 140 and a display unit 162 for displaying a movement distance of the probing rod 161; and an air path 170 formed from the air cap 132 toward the block 130 and an end portion of the lower guide 123 of the fixed pipe 120 in order to supply air into the cylinder chamber or to induce a vacuum state of the cylinder chamber through inflow and outflow of air.

A bearing assembly 180 is disposed on the block 130 so that the rod 140 can be rotated, and a handle 190 for rotation of the housing 110 is protrudingly formed on the opposite side of the air cap 132.

The handle 190 is located to be symmetrical to the air cap 132 connected with the tube (T) so that the worker can easily rotate the handle with both hands.

Figure 3:
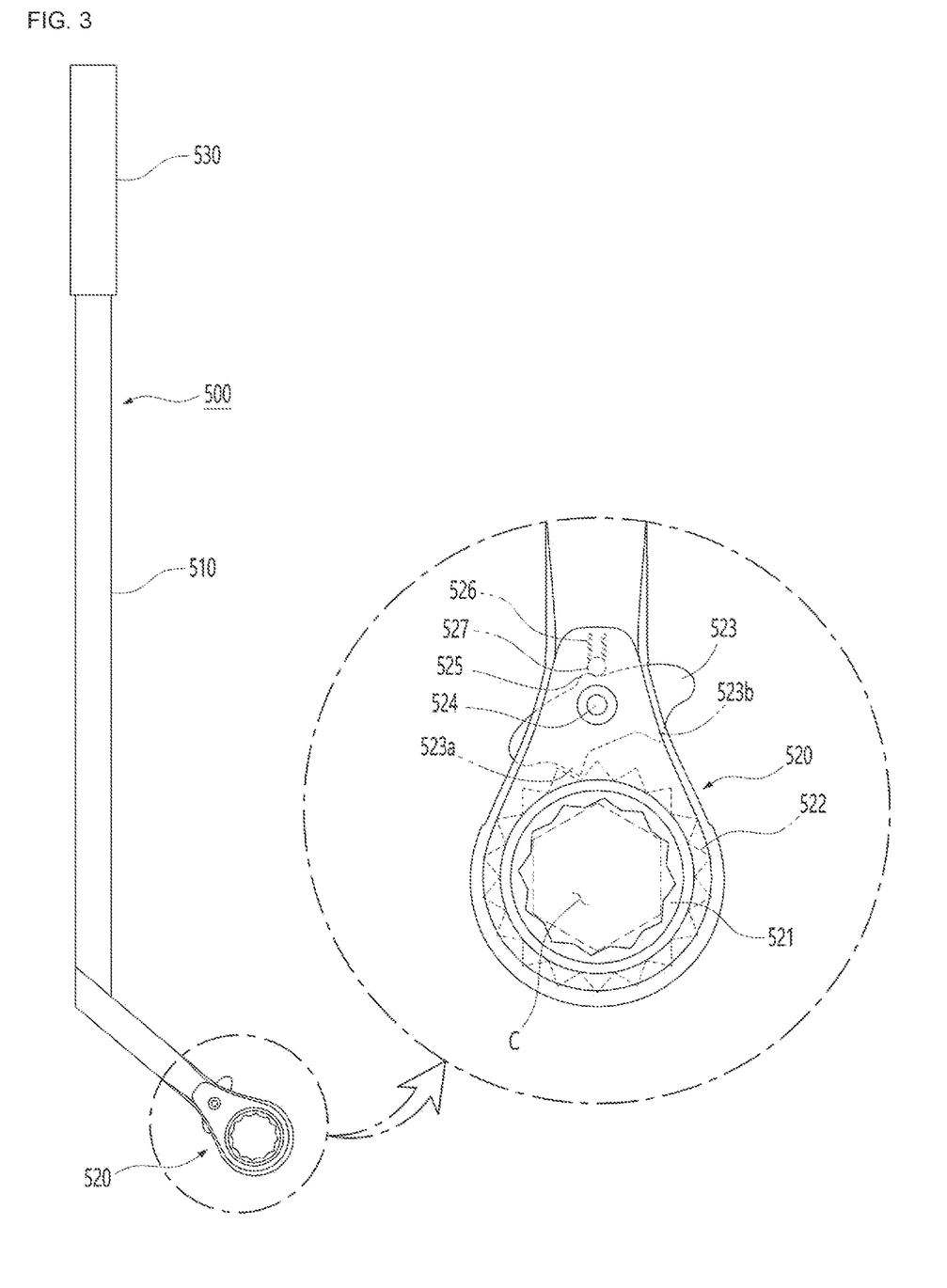
FIG. 3 is an enlarged sectional view of the rotary jig and essential parts applied to FIG. 2.

The rotary jig 500 includes a rod 510 with which the handle is combined, and a unidirectional rotor 520 provided to an end portion of the rod 510 to rotate the crank shaft (C) in one direction.

The unidirectional rotor 520 includes: a coupler 521 which is rotatably mounted at the end portion of the rod and has an inner diameter of a polygonal part; a gear 522 formed along the outer circumference of the coupler 521; a conversion breaker 523 which is combined with the end portion of the rod 510 to be rotated around an intermediate rotary shaft 524 and has coupling protrusions 523a and 523b formed at both end portions to be geared with the gear 522; and a locking ball 527 combined with the end portion of the rod 510 and elastically supported by elastic force of a spring 526 to slidably support an intermediate protruding port 525 of the conversion breaker 523.

A handle 530 is mounted at the end portion of the rod 510 so that the worker can easily rotate the handle with the hand.

Now, a process of diagnosing the engine by the measuring system for checking whether the bearing clearance of the vehicle engine is normal will be described as follows.

The present invention is to measure the normal state of the engine by measuring the piston motion with respect to the bearing clearance applied to connecting rod (N) in the vehicle engine including the crank shaft (C), the connecting rod (N) and the piston (P).

The present invention can measure the operational state of the engine through the rotary jig 500 mounted on the crank shaft (C) of the engine, a meter reading bar 600 for a first diagnosis, the probe 100 for detailed measurement after the first diagnosis, the air supplier 200 for supplying air to the cylinder chamber (S) to measure pressure of the piston (P), and the air inhaler 300 for making a vacuum state of the cylinder chamber (S) by inhaling air to measure movement of the piston (P).

The worker dismantles the spark plug of the engine room so as to expose the cylinder chamber (S), and performs the following steps in consecutive order in order to measure and diagnose whether the engine works normally.

Figure 6:
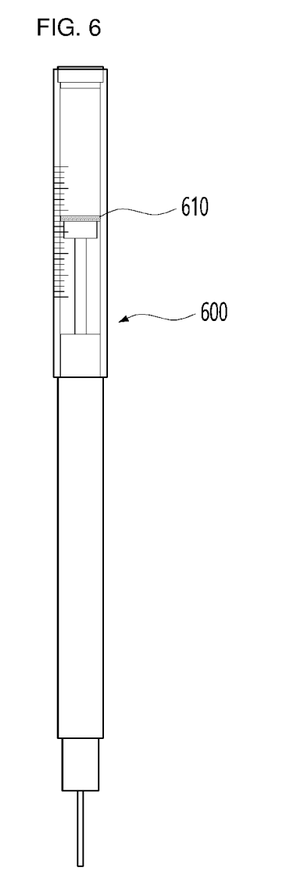
FIG. 6 is a front view of a meter reader applied when an operational state of the vehicle engine is measured according to the present invention.
Figure 7:
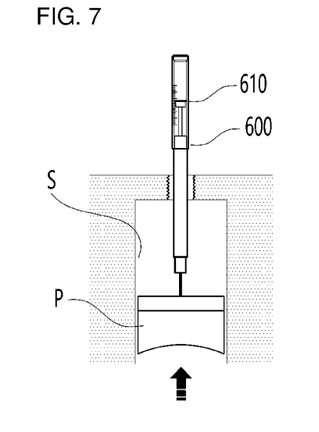
FIG. 7 is a schematic diagram showing a combined state of the meter reader of FIG. 6 during the process of measuring a normal state of the piston by the measuring system for the vehicle engine according to the present invention.
Figure 8:
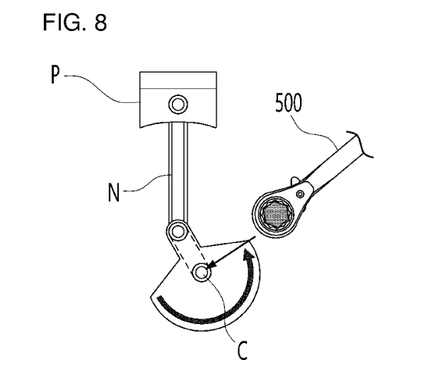
FIG. 8 is a schematic diagram showing a process of rotating the piston to be located at a top dead point as shown in FIG. 7 in order to measure the operational state by the meter reader of FIG. 7.
Figure 11:
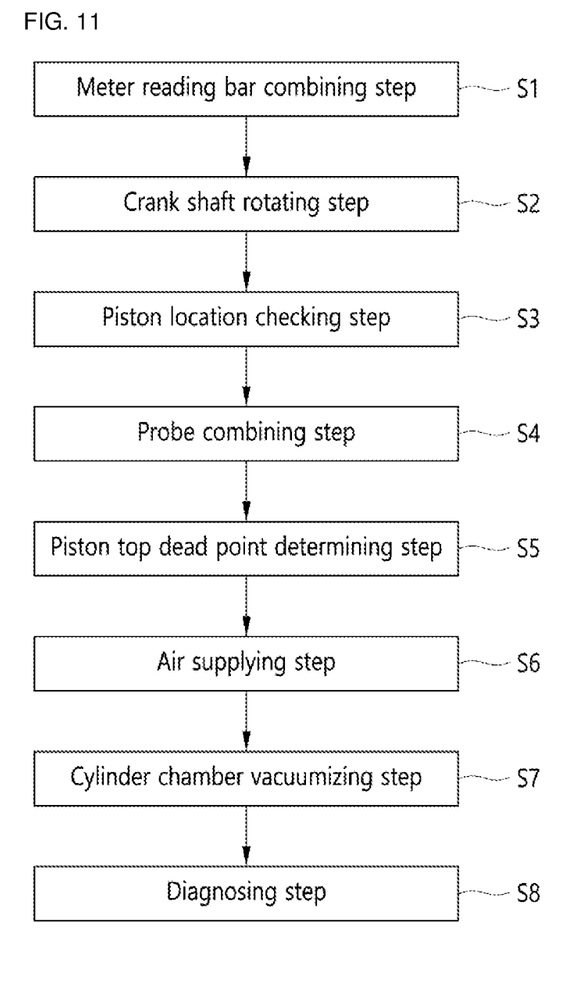
FIG. 11 is a flow chart showing a diagnosis process by the measuring system for the vehicle engine according to the present invention.

That is, referring to FIGS. 1 to 6 and 7 to 10, a measuring method for a vehicle engine illustrated in FIG. 11 will be described. The measuring method for the vehicle engine includes: a meter reading bar combining step (S1) of inserting the meter reading bar 600 into the cylinder chamber (S) in such a way that the lower end of the meter reading bar is located at the center of the upper surface of the piston (P); a crank shaft rotating step (S2) of mounting the rotary jig 500 at the end portion of the crank shaft (C) as shown in FIG. 8 and rotating the crank shaft (C); a piston location checking step (S3) of checking whether the piston (P) is located at the top dead point by checking gradations 610 of the meter reading bar 600; a probe combining step (S4) of separating the meter reading bar 600 after checking whether the piston (P) is located at the top dead point, and screw-coupling the probe 100 to the screw part 124 from which the spark plug is separated so that the lower end of the probe 100 is located at the center of the piston (P); a piston top dead point determining step (S5) of checking whether the piston (P) is located at the top dead point through rotation of the rotary jig 500; an air supplying step (S6) of supplying air to the cylinder chamber (S); a cylinder chamber vacuumizing step (S7) of discharging the air of the cylinder chamber (S) to make the cylinder chamber in a vacuum state after measuring the piston (P); and a diagnosing step (S8) of determining and diagnosing whether the engine works normally through the display unit of the probe 100.

In the meter reading bar combining step (S1), first, the spark plug of the vehicle engine is rotated in a loosening direction to be separated, and the meter reading bar 600 is inserted into the mounted position of the separated spark plug so that the lower end of the meter reading bar 600 is located at the center of the upper surface of the piston (P).

Preferably, the meter reading bar 600 is a round bar and has the lower end located on the upper surface of the piston (P) and the upper end exposed to the outside so that the worker can see it with naked eyes.

In the crank shaft rotating step (S2), the rotary jig 500 is connected to the crank shaft (C) protruding from the engine in the state where the bonnet is open, and then, is moved back and forth so that the crank shaft (C) can be rotated.

In the above state, when the worker rotates the rotary jig 500, the crank shaft (C) is rotated, and the connecting rod (N) moves the piston (P) upwards. In this instance, the worker stops the rotation when feeling that the piston (P) is located at the top dead point. Then, the piston location checking step (S3) is finished.

That is, in the piston location checking step (S3), the worker rotates the crank shaft (C) in order to check whether the piston (P) is located at the top dead point through the location of the top dead point of the meter reading bar 600.

In the probe combining step (S4), the meter reading bar 600 is separated, and the probe 100 is screw-coupled and fixed to the mounted position of the spark plug.

Here, before the probe combining step (S4), if the piston (P) is located at the top dead point and is in measurable state, the step of checking the location of the piston by the meter reading bar 600 may be omitted.

In the piston top dead point determining step (S5), the rotary jig 500 is rotated in order to check whether the piston (P) is located at the top dead point through an indication value of the probe 100.

In the air supplying step (S6), the air supplier 200 is combined with the tube (T) connected to the probe 100 in order to supply air through the air supplier 200.

In the cylinder chamber vacuumizing step (S7), the tube (T) is separated from the air supplier 200, and then, the air inhaler 300 is combined with the tube (T) connected to the probe 100 to inhale air through the air inhaler 300.

In the diagnosing step (S8), the measuring system operates the air supplier 200 and the air inhaler 300 through the signal value of the probe 100, receives the signal values generated from the air supplier 200 and the air inhaler 300 through the control unit 400, compares the received signal values with previously stored memory values, determines whether the engine is operated normally, and then, outputs the determination result through the display unit.

As described above, while the present invention has been particularly shown and described with reference to the example embodiments thereof, it will be understood by those of ordinary skill in the art that the present invention is not limited to the embodiments and various changes, modifications and equivalents may be made in the present invention without departing from the technical scope and idea of the present invention. It will be understood by those skilled in the art to which the present invention is widely applicable through various replacements, modifications and equivalents of components. Therefore, it should be understood by those of ordinary skill in the art that all contents related with modifications, changes and applications of technical features of the present invention belong to the technical idea and scope of the present invention.

The invention claimed is:

1. A measuring system for a vehicle engine to determine whether a piston motion is normal in the vehicle engine including having a crank shaft, the connecting rod and a piston, the measuring system comprising:
   a probe configured to be screw-coupled to a location where a spark plug is to be mounted in a state where a lower portion of the spark plug is separated from the vehicle engine, the probe including measuring rod extending from the center thereof, wherein an end portion of the measuring rod is located at the center of the upper surface of the piston and is located at a top dead point of the piston according to rotation of the crank shaft in order to measure the top dead point of the piston and to output a corresponding signal value;
   an air supplier configured to be connected with a tube to supply air into an air path formed in the probe and to apply pressure to the piston, the air supplier configured to sense air pressure;
   an air inhaler configured to be connected with the tube to inhale air through the air path formed in the probe in order to make the inside of the cylinder chamber in a vacuum state, the air inhaler configured to sense air pressure;
   a control unit configured to operate the air supplier and the air inhaler through a signal value of the probe, to receive signal values generated from the air supplier and the air inhaler, to compare the signal values with stored memory values in order to determine whether or not the engine works normally, and to output the determination result to a display unit; and
   a rotary jig configured to rotate the crank shaft.

2. The measuring system according to claim 1, wherein the rotary jig comprises:
   a rod with which a handle is combined, and a unidirectional rotor provided to an end portion of the rod to rotate the crank shaft in one direction, and
   wherein the unidirectional rotor comprises:
      a coupler which is rotatably mounted at the end portion of the rod and has a polygonal inner periphery;
      a gear formed along the outer circumference of the coupler;
      a conversion breaker which is combined with the end portion of the rod to be rotated around an intermediate rotary shaft and has coupling protrusions formed at both end portions to mesh with the gear; and
      a locking ball combined with the end portion of the rod and elastically supported by elastic force of a spring to slidably support an intermediate protruding port of the conversion breaker.

3. The measuring system according to claim 1, wherein the probe comprises:
   a cylindrical housing;
   a fixed pipe including a guide hole formed in the middle in an axial direction, a central extension part, an upper guide fit and configured to be fixed to a lower end of the housing while the central extension part is caught to the lower end of the housing, a lower guide disposed at a lower part to be inserted into a location where the spark plug of the engine is to be mounted, and a screw part configured to be screw-coupled to the location for the spark plug;
   a block configured to be combined with the upper part of the housing and including an air cap fixed at the outside thereof to facilitate air injection and air discharge through the tube;
   a rod configured to be combined with the housing in the axial direction and including a lower end protruding through the guide hole of the fixed pipe and an upper end penetrating through the guide hole formed at the center of the block, the rod configured to be combined in a vertically movable manner through the guide hole;
   a slide pipe configured to be combined with the block and including a guide hole;
   a probing gauge configured to be slidably inserted into the guide hole of the slide pipe and including a probing rod an end portion of which is put on the top of the rod, the probing gauge further including a display unit configured to display a movement distance of the probing rod;
   an air path formed from the air cap toward the block and an end portion of the lower guide of the fixed pipe in order to supply air into the cylinder chamber or to induce a vacuum state of the cylinder chamber through inflow and outflow of air;
   a bearing assembly disposed on the block so that the rod can be rotated; and
   a handle disposed on the block to rotate the housing.

4. A measuring method for a vehicle engine to determine whether a piston motion is normal in the vehicle engine having including a crank shaft, the connecting rod and a piston, the measuring method comprising:
   a probe combining step of separating a spark plug of the vehicle engine in a bonnet opening state and screw-coupling and fixing a probe to location where the spark plug is separated from the vehicle engine;
   a piston top dead point determining step of rotating a rotary jig to check whether the piston is located at a top dead point through an indication value of the probe;
   an air supplying step of combining an air supplier to a tube connected to the probe in order to supply air through the air supplier;
   a cylinder chamber vacuuming step of separating the tube from the air supplier and combining an air inhaler with the tube connected to the probe in order to inhale air through the air inhaler; and
   a diagnosing step of operating the air supplier and the air inhaler through a signal value of the probe, receiving signal values generated from the air supplier and the air inhaler through a control unit, comparing the signal values with previously stored memory values to determine whether the engine is operating normally, and outputting the determination result to a display unit, and
   further comprising, before the probe combining step:
   a crank shaft rotating step of opening a bonnet in a vehicle stop state, connecting the rotary jig to the crank shaft of the engine, and moving the rotary jig back and forth to rotate the crank shaft;
   a meter reading bar combining step of separating the spark plug of the vehicle engine, and inserting a meter reading bar into the position where the spark plug is separated so that the lower end of the meter reading bar is located at the center of the upper surface of the piston; and
   a piston location checking step of rotating the rotary jig in the state where the meter reading bar is inserted in order to check whether the piston is located at a top dead point.

5. A measuring system for a vehicle engine to determine whether a piston motion is normal in the vehicle engine including a crank shaft, the connecting rod and a piston, the measuring system comprising:

a probe configured to be screw-coupled to a location where a spark plug is to be mounted in a state where a lower portion of the spark plug is separated from the vehicle engine, the probe including a measuring rod extending from the center thereof, wherein an end portion of the measuring rod is located at the center of the upper surface of the piston and is located at a top dead point of the piston according to rotation of the crank shaft in order to measure the top dead point of the piston and to output a corresponding signal value;

an air supplier configured to be connected with a tube to supply air into an air path formed in the probe and to apply pressure to the piston, the air supplier configured to sense air pressure;

an air inhaler configured to be connected with the tube to inhale air through the air path formed in the probe in order to make the inside of the cylinder chamber in a vacuum state, the air inhaler configured to sense air pressure; and a control unit configured to operate the air supplier and the air inhaler through a signal value of the probe, to receive signal values generated from the air supplier and the air inhaler, to compare the signal values with stored memory values in order to determine whether or not the engine works normally, and to output a determination result to a display unit, wherein the probe comprises:

a cylindrical housing;

a fixed pipe including a guide hole formed in the middle in an axial direction, a central extension part, an upper guide fit and configured to be fixed to a lower end of the housing while the central extension part is caught to the lower end of the housing, a lower guide disposed at a lower part to be inserted into a location where the spark plug of the engine is to be mounted, and a screw part configured to be screw-coupled to the location for the spark plug;

a block configured to be combined with the upper part of the housing and including an air cap fixed at the outside thereof to facilitate air injection and air discharge through the tube;

a rod configured to be combined with the housing in the axial direction and including a lower end protruding through the guide hole of the fixed pipe and an upper end penetrating through the guide hole formed at the center of the block, the rod configured to be combined in a vertically movable manner through the guide hole;

a slide pipe configured to be combined with the block and including a guide hole;

a probing gauge configured to be slidably inserted into the guide hole of the slide pipe and including a probing rod an end portion of which is put on the top of the rod, the probing gauge further including a display unit configured to display a movement distance of the probing rod;

an air path formed from the air cap toward the block and an end portion of the lower guide of the fixed pipe in order to supply air into the cylinder chamber or to induce a vacuum state of the cylinder chamber through inflow and outflow of air;

a bearing assembly disposed on the block so that the rod can be rotated; and a handle disposed on the block to rotate the housing.

* * * * *